(No Model.) 2 Sheets—Sheet 2.

R. STEVENS.
FURNACE VALVE.

No. 570,272. Patented Oct. 27, 1896.

WITNESSES
INVENTOR
Richard Stevens

UNITED STATES PATENT OFFICE.

RICHARD STEVENS, OF BRADDOCK, PENNSYLVANIA.

FURNACE-VALVE.

SPECIFICATION forming part of Letters Patent No. 570,272, dated October 27, 1896.

Application filed April 17, 1896. Serial No. 588,052. (No model.)

*To all whom it may concern:*

Be it known that I, RICHARD STEVENS, of Braddock, in the county of Allegheny and State of Pennsylvania, have invented a new and useful Improvement in Furnace-Valves, of which the following is a full, clear, and exact description, reference being had to the accompanying drawings, forming part of this specification, in which—

Figure 1:
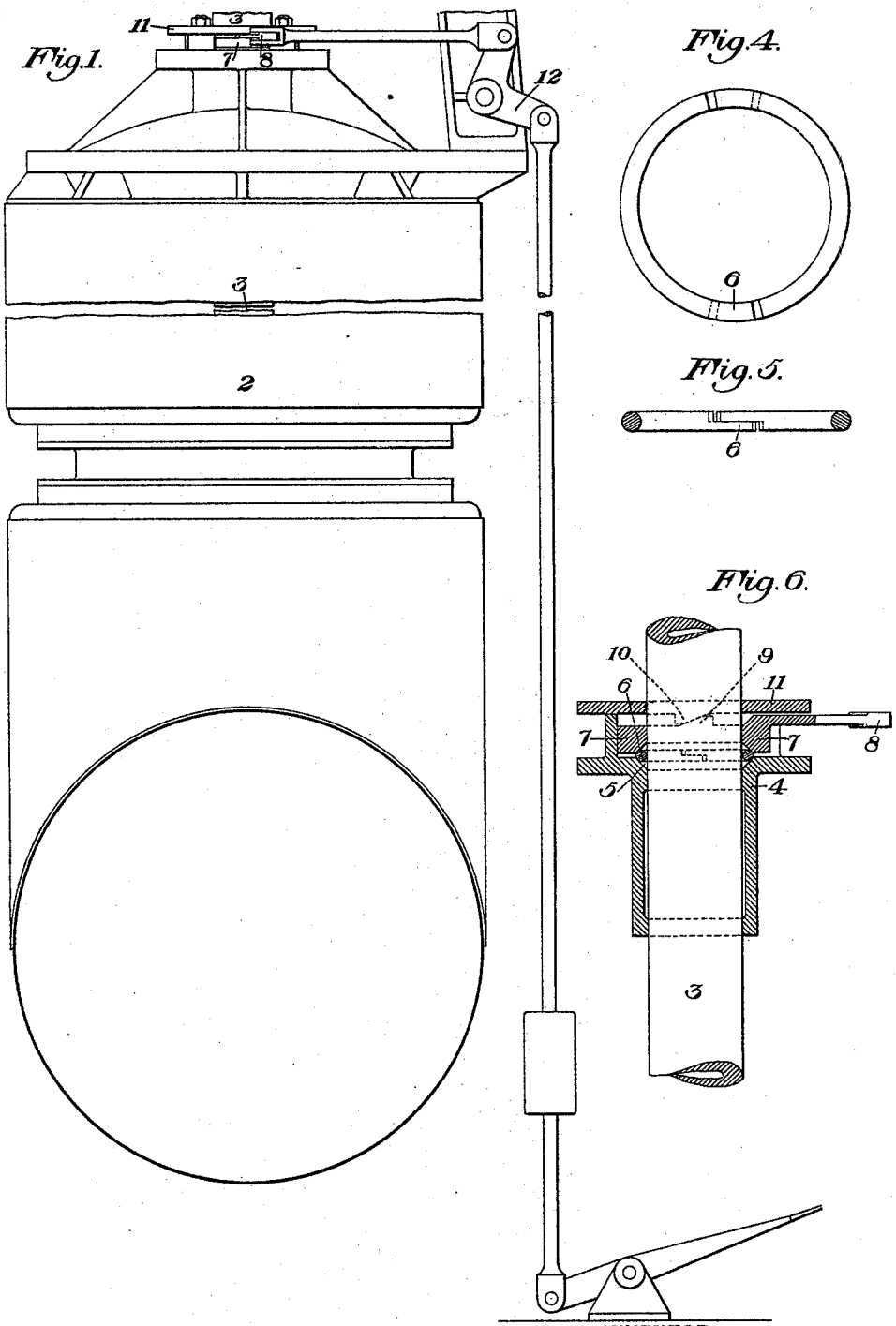
Figure 2:
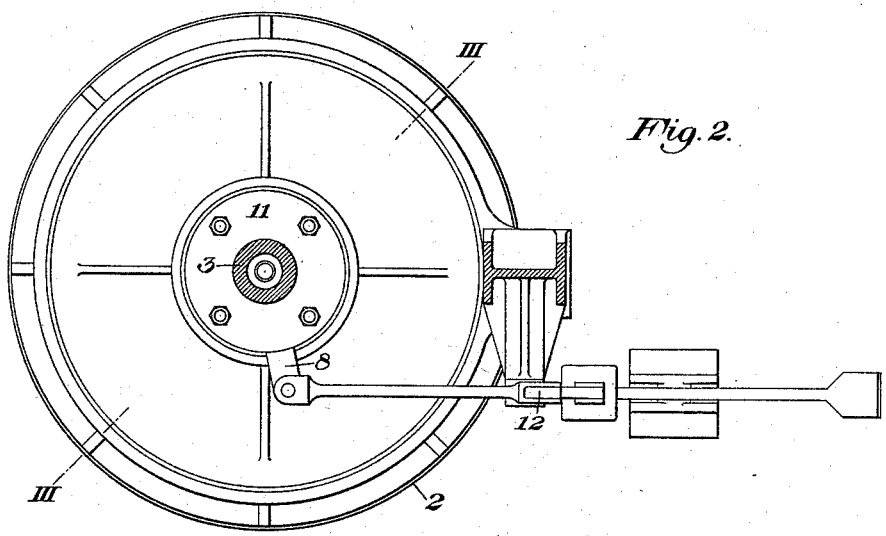
Figure 3:
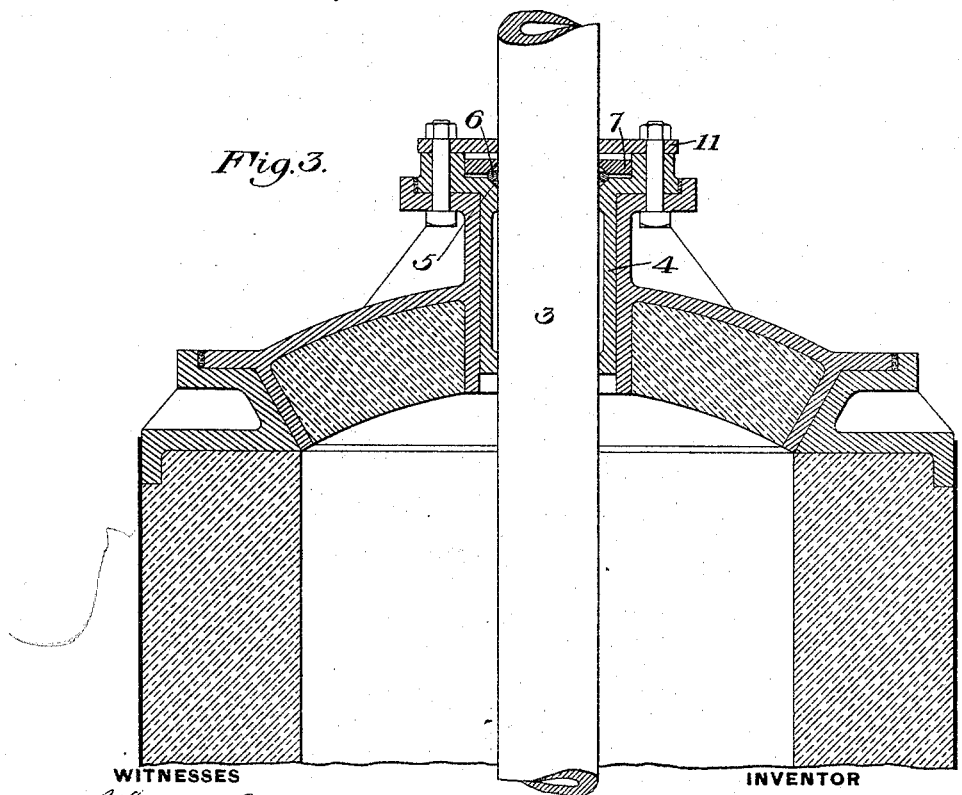

Figure 1 is a side elevation of my improved hot-blast valve. Fig. 2 is a plan view, partly in section. Fig. 3 is a detail vertical section on the line III III of Fig. 2. Fig. 4 is a detail view of the divided metallic packing-ring. Fig. 5 is a cross-section of the same, and Fig. 6 is a detail view of the ring-clamping mechanism.

The object of my invention is to provide means for preventing the leakage of air or gases around the stems of valves, which in the use of valves for furnaces is apt to rapidly corrode and destroy the stem, and is a source of serious trouble and injury to the mechanism.

The invention consists in combining with the valve-stem a packing-ring which surrounds it and means for clamping the packing-ring, tightening the same after the valve has been moved, and releasing it prior to its movement.

In the drawings, 2 represents the chamber of a hot-blast valve, and 3 is a valve-stem, which extends through the head of the valve-chamber and through a cylindrical bushing 4 set therein. At the upper end of this bushing is a conical or concave seat 5, on which is set a divided metallic packing-ring 6, and upon it is set a rotary follower or gland 7, the lower face of which is also tapering or conical. This gland has a projecting arm 8, by which it may be rotated partially, and on its upper face it has an inclined portion or portions 9, fitting against corresponding portions 10 on a cap-ring 11, which is fitted upon and is bolted to the bushing. On turning the gland by means of the lever 8 the engagement of the faces 9 and 10 forces the gland down upon the packing-ring, and by reason of the tapering form of the surfaces bearing against the ring the latter will be compressed and caused to fit snugly around the stem 3, thus sealing the surrounding space against the exit of any leaking air or gases and clamping the stem so tightly as to resist the force ordinarily employed to move it. The arm 8 may be connected by lever and connecting mechanism 12 with a position which is in easy access of the operator of the valve.

After the furnace-valve has been moved so as to admit hot air or gas into the valve-chamber the operator moves the rotary gland, so as to compress the packing-ring around the valve-stem, as above explained; and when it is next desired to move the valve the gland is turned in the reverse direction, so as to relieve the pressure on the packing-ring and to permit the stem to be moved within the same.

The advantages of my invention will be appreciated by those skilled in the art, and within the scope of my broader claim many changes in the form and construction of the parts may be made by the skilled mechanic. For example, other mechanism may be used for compressing and releasing the packing-ring, and the packing-ring itself may be modified in construction and arrangement.

I claim—

1. As means for packing a furnace-valve stem, the combination with the hot-gas-valve stem of a surrounding packing-ring, a follower or gland adapted to be moved to compress the same tightly and to clamp the stem, and adapted also to be moved in a reverse direction to loosen the packing and release the stem, and means for so moving the gland or follower at each motion of the stem; substantially as described.

2. As means for packing a furnace-valve stem, the combination with the hot-gas-valve stem of a surrounding packing-ring, a follower or gland adapted to be moved to compress the same tightly and to clamp the stem, and adapted also to be moved in a reverse direction to loosen the packing and release the stem, and mechanism extending to the position of the operator of the furnace-valve; substantially as described.

3. As means for packing a furnace-valve stem, a surrounding metallic packing-ring, a rotatory follower or gland adapted to compress the same, and a projecting arm for turning the follower or gland; substantially as described.

4. The combination with the valve-stem, of a bushing through which it passes, a concave seat at the end of the bushing, a packing-ring, a rotatory follower or gland on the bushing bearing on the ring, and a cap-ring fixed to the bushing and bearing on the follower or gland; substantially as described.

In testimony whereof I have hereunto set my hand.

RICHARD STEVENS.

Witnesses:
H. W. CORWIN,
G. I. HOLDSHIP.